US012598499B2

(12) United States Patent
Yang et al.

(10) Patent No.: US 12,598,499 B2
(45) Date of Patent: Apr. 7, 2026

(54) INTERFERENCE MEASUREMENT METHOD AND APPARATUS, TERMINAL, AND NETWORK SIDE DEVICE

(71) Applicant: VIVO MOBILE COMMUNICATION CO., LTD., Chang'an (CN)

(72) Inventors: Kun Yang, Chang'an (CN); Dajie Jiang, Chang'an (CN)

(73) Assignee: VIVO MOBILE COMMUNICATION CO., LTD., Chang'an (CN)

( * ) Notice: Subject to any disclaimer, the term of this patent is extended or adjusted under 35 U.S.C. 154(b) by 369 days.

(21) Appl. No.: 18/324,664

(22) Filed: May 26, 2023

(65) Prior Publication Data

US 2023/0328573 A1 Oct. 12, 2023

Related U.S. Application Data

(63) Continuation of application No. PCT/CN2021/132351, filed on Nov. 23, 2021.

(30) Foreign Application Priority Data

Nov. 26, 2020 (CN) .......................... 202011356528.4

(51) Int. Cl.
*H04W 24/10* (2009.01)
*H04L 5/00* (2006.01)
(52) U.S. Cl.
CPC ........... *H04W 24/10* (2013.01); *H04L 5/0051* (2013.01)
(58) Field of Classification Search
CPC .............................. H04W 24/10; H04L 5/0051
See application file for complete search history.

(56) References Cited

U.S. PATENT DOCUMENTS

| | | | |
|---|---|---|---|
| 9,161,236 B2 | 10/2015 | Seo et al. | |
| 2012/0170508 A1 | 7/2012 | Sawai | |
| 2021/0288707 A1* | 9/2021 | Hang ..................... | H04B 7/026 |

FOREIGN PATENT DOCUMENTS

| | | |
|---|---|---|
| CN | 102595436 A | 7/2012 |
| CN | 102656913 A | 9/2012 |
| CN | 103052087 A | 4/2013 |
| CN | 110392385 A | 10/2019 |
| JP | 2011091783 A | 5/2011 |
| WO | 2020198977 A1 | 10/2020 |
| WO | 2023000287 A1 | 1/2023 |

* cited by examiner

*Primary Examiner* — Ronald B Abelson
(74) *Attorney, Agent, or Firm* — Foley & Lardner LLP

(57) ABSTRACT

An interference measurement method and apparatus, a terminal, a network side device are provided. An interference measurement method includes: acquiring, by first base station in first cell, state information, where state information includes at least one of: operating parameter of target wireless auxiliary device, configuration information of reference signal of second cell, and first measurement result of second cell for wireless signal of first cell, and second cell is neighboring cell of first cell; configuring, by first base station, measurement parameter for first terminal based on state information, where measurement parameter includes measurement object for assessing interference jointly caused by second cell and target wireless auxiliary device to first terminal, and first terminal is a terminal accessing first cell; and receiving, by first base station, second measurement result reported by first terminal that is obtained by first terminal by measuring measurement object.

20 Claims, 7 Drawing Sheets

500                                                                    S510

A terminal in a cell A measures a plurality of reference signals transmitted by a base station in the cell A

S512

The base station in the cell A acquires a reference signal of a base station in a cell B through interaction between the base stations, and provides, for the base station in the cell B, reference signals of the cell A that are used for measuring/ training forwarding beams of the reconfigurable intelligent surface device

S514

The cell A and the cell B determine a reflected beam of the reconfigurable intelligent surface device based on a measurement result, and schedule a matching terminal

FIG. 5

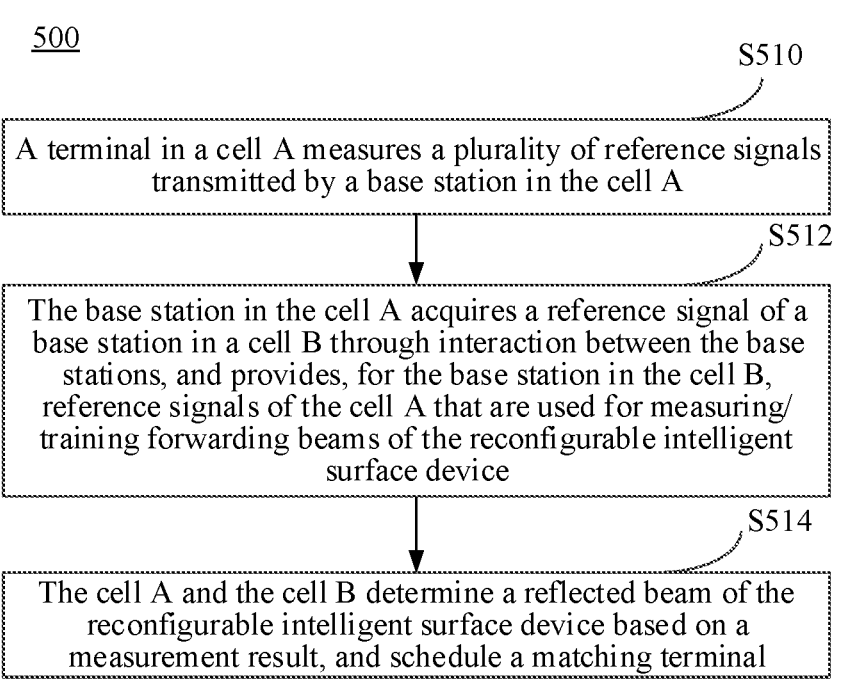

600

601

Acquisition module

602

Configuration module

604

First receiving module

605

Scheduling module

FIG. 6

INTERFERENCE MEASUREMENT METHOD AND APPARATUS, TERMINAL, AND NETWORK SIDE DEVICE

CROSS-REFERENCE TO RELATED APPLICATIONS

The present application is continuation application of PCT International Application No. PCT/CN2021/132351 filed on Nov. 23, 2021, which claims priority to Chinese Patent Application No. 202011356528.4, filed with the China National Intellectual Property Administration on Nov. 26, 2020 and entitled "INTERFERENCE MEASUREMENT METHOD AND APPARATUS, TERMINAL, AND NETWORK SIDE DEVICE", which are incorporated in their entireties by reference herein.

TECHNICAL FIELD

This application belongs to the field of wireless communications technologies, and specifically, to an interference measurement method and apparatus, a terminal, and a network side device.

BACKGROUND

In a radio resource management (RRM) function of new radio (NR), a wireless transmission part and available resources of a network are flexibly allocated and dynamically adjusted in a case that network traffic is unevenly distributed, channel characteristics fluctuate due to channel fading and interference, or the like, so as to maximize utilization of a wireless spectrum, prevent network congestion, and minimize signaling load.

In the RRM of the NR, a terminal needs to complete a signal measurement task based on a network configuration. A measured reference signal configured by a network may be a synchronization signal/physical broadcast channel signal block (or a synchronization signal block) (Synchronization Signal and PBCH block, SSB), or may be a channel state information-reference signal (CSI-RS). A measurement result undergoes L1 filtering and is then reported to a higher layer. The network makes a related scheduling decision based on the measurement result, for example, makes a decision on intra-frequency or inter-frequency switching, or inter-radio access technology (RAT) switching.

In a future wireless network, for example, beyond 5G (B5G) or 6G, to improve communication quality, a wireless auxiliary device may be deployed in a cell, and communication data between a terminal and a base station may be forwarded through the wireless auxiliary device. For example, a reconfigurable intelligent surface (RIS) device may be deployed, and a reflection array formed by device units of the reconfigurable intelligent surface device forwards a wireless communication signal between the base station and the terminal. For another example, a physical layer relay node and/or backscatter node with a beam forwarding function may be deployed, and a beam link is established between the relay node and the terminal, to forward a signal of the base station to the terminal by using a specific beam.

In specific application, a wireless auxiliary device such as a reconfigurable intelligent surface device may affect signals of base stations in a plurality of neighboring cells within a coverage area of the wireless auxiliary device. Different forwarding beams of the wireless auxiliary device cause different interference to neighboring cells. If an existing measurement method is used, interference caused by different beams of the wireless auxiliary device such as the reconfigurable intelligent surface device to a terminal cannot be measured. As a result, a wireless transmission part cannot be effectively adjusted, and available resources of a network cannot be effectively utilized, leading to unstable quality of communication between neighboring cells, and reducing utilization of a wireless spectrum.

SUMMARY

According to a first aspect, an interference measurement method is provided. The method includes: acquiring, by a first base station in a first cell, state information, where the state information includes at least one of the following: an operating parameter of a target wireless auxiliary device, configuration information of a reference signal of a second cell, and a first measurement result, the second cell is a neighboring cell of the first cell, and the first measurement result is a measurement result obtained by measuring a reference signal of the first cell jointly by a second terminal in the second cell and the target wireless auxiliary device; configuring, by the first base station, a measurement parameter for a first terminal based on the state information, where the measurement parameter includes a measurement object, the measurement object is used for assessing interference jointly caused by the second cell and the target wireless auxiliary device to the first terminal, and the first terminal is a terminal accessing the first cell; and receiving, by the first base station, a second measurement result reported by the first terminal, where the second measurement result is a result obtained by the first terminal by measuring the measurement object.

According to a second aspect, an interference measurement apparatus is provided, and is applied to a first base station in a first cell. The apparatus includes: an acquisition module, configured to acquire state information, where the state information includes at least one of the following: an operating parameter of a target wireless auxiliary device, configuration information of a reference signal of a second cell, and a first measurement result, the second cell is a neighboring cell of the first cell, and the first measurement result is a measurement result obtained by measuring a reference signal of the first cell jointly by a second terminal in the second cell and the target wireless auxiliary device; a configuration module, configured to configure a measurement parameter for a first terminal based on the state information, where the measurement parameter includes a measurement object, the measurement object is used for assessing interference jointly caused by the second cell and the target wireless auxiliary device to the first terminal, and the first terminal is a terminal accessing the first cell; and a receiving module, configured to receive a second measurement result reported by the first terminal, where the second measurement result is a result obtained by the first terminal by measuring the measurement object.

According to a third aspect, an interference measurement method is provided, including: receiving, by a first terminal, a measurement parameter configured by a first base station in a first cell, where the measurement parameter includes a measurement object, the measurement object is used for assessing interference jointly caused by a second cell and a target wireless auxiliary device to the first terminal, the second cell is a neighboring cell of the first cell, and the first terminal is a terminal accessing the first cell; and performing interference measurement based on the measurement parameter, and reporting a measurement result to the first base station, where the measurement result is a result obtained by the first terminal by measuring the measurement object.

According to a fourth aspect, an interference measurement apparatus is provided, including: a second receiving module, configured to receive a measurement parameter configured by a first base station in a first cell, where the measurement parameter includes a measurement object, the measurement object is used for assessing interference jointly caused by a second cell and a target wireless auxiliary device to the first terminal, the second cell is a neighboring cell of the first cell, and the first terminal is a terminal accessing the first cell; and a reporting module, configured to perform interference measurement based on the measurement parameter, and report a measurement result to the first base station, where the measurement result is a result obtained by the first terminal by measuring the measurement object.

According to a fifth aspect, a network side device is provided, where the network side device includes a processor, a memory, and a program or instructions stored in the memory and capable of running on the processor, and when the program or instructions are executed by the processor, the steps of the method according to the first aspect are implemented.

According to a sixth aspect, a terminal is provided, where the terminal includes a processor, a memory, and a program or instructions stored in the memory and capable of running on the processor, and when the program or instructions are executed by the processor, the steps of the method according to the third aspect are implemented.

According to a seventh aspect, a readable storage medium is provided, where the readable storage medium stores a program or instructions, and when the program or instructions are executed by a processor, the steps of the method according to the first aspect are implemented, or the steps of the method according to the third aspect are implemented.

According to an eighth aspect, a chip is provided, where the chip includes a processor and a communications interface, the communications interface is coupled to the processor, and the processor is configured to run a program or instructions for a terminal, to implement the steps of method according to the first aspect; or the processor is configured to run a program or instructions for a network side device, to implement the steps of the method according to the third aspect.

According to a ninth aspect, a computer program product is provided, where the computer program product includes a processor, a memory, and a program or instructions stored in the memory and capable of running on the processor, and when the program or instructions are executed by the processor, the steps of the method according to the first aspect are implemented, or the steps of the method according to the third aspect are implemented.

BRIEF DESCRIPTION OF THE DRAWINGS

FIG. 5 is still another flowchart of an interference measurement method according to an embodiment of this application;

FIG. 6 is a schematic structural diagram of an interference measurement apparatus according to an embodiment of this application;

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects instead of describing a specific order or sequence. It should be understood that the data used in this way is interchangeable in appropriate circumstances, so that the embodiments of this application can be implemented in other orders than the order illustrated or described herein. In addition, the objects distinguished by "first" and "second" usually belong to one category, and the number of objects is not limited. For example, there may be one or more first objects. In addition, in the specification and claims, "and/or" represents at least one of connected objects, and the character "/" typically represents an "or" relationship between the associated objects.

It should be noted that the technologies described in the embodiments of this application are not limited to a long term evolution (LTE)/LTE-advanced (LTE-A) system and a 5G NR system, and may be further used in other wireless communications systems, such as a future 6G communications system, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used in the aforementioned systems and radio technologies, and may also be used in other systems and radio technologies. In the following descriptions, a new radio (NR) system is described for an illustration purpose, and NR terms are used in most of the following descriptions, but these technologies may also be applied to applications other than an NR system application, for example, a 6th generation (6G) communications system.

Figure 1:
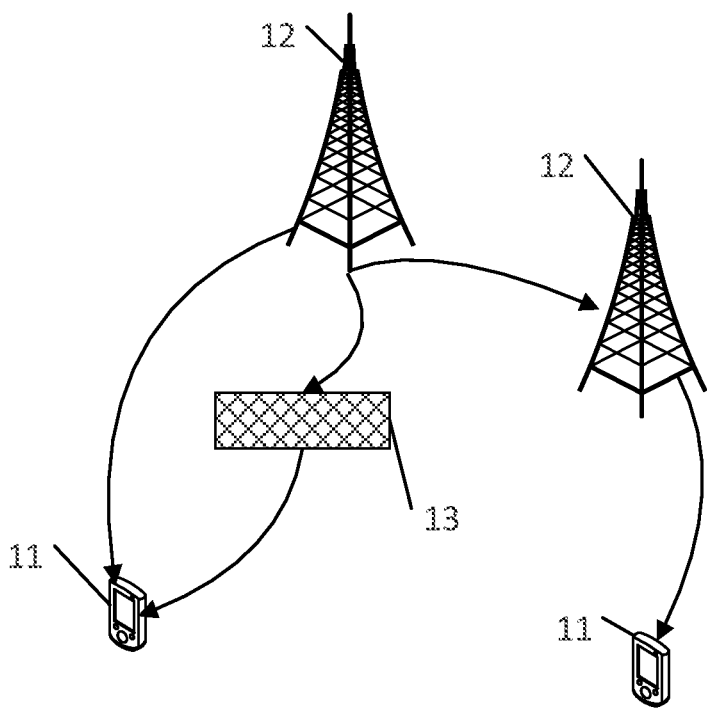
FIG. 1 is a schematic diagram of a wireless communications system to which an embodiment of this application is applicable.

FIG. 1 is a schematic diagram of a wireless communications system to which an embodiment of this application is applicable. The wireless communications system includes a terminal 11, a wireless auxiliary device 13, and a network side device 12. The terminal 11 may also be referred to as a terminal device or user equipment (UE). The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a band, a headset, glasses, or the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. The wireless auxiliary device 13 may be a reconfigurable intelligent surface device, or may be a layer 1 (L1) relay device, or may be an L1 repeater or backscatter. A target wireless auxiliary device may have a beamforming function, or may not have a beamforming function. It should be noted that, in the embodiments of this application, a base station in an NR system is merely used as an example, but a specific type of the base station is not limited.

The following describes in detail an interference measurement method provided in the embodiments of this application with reference to the accompanying drawings and by using specific embodiments and application scenarios thereof.

Figures 2, 3:
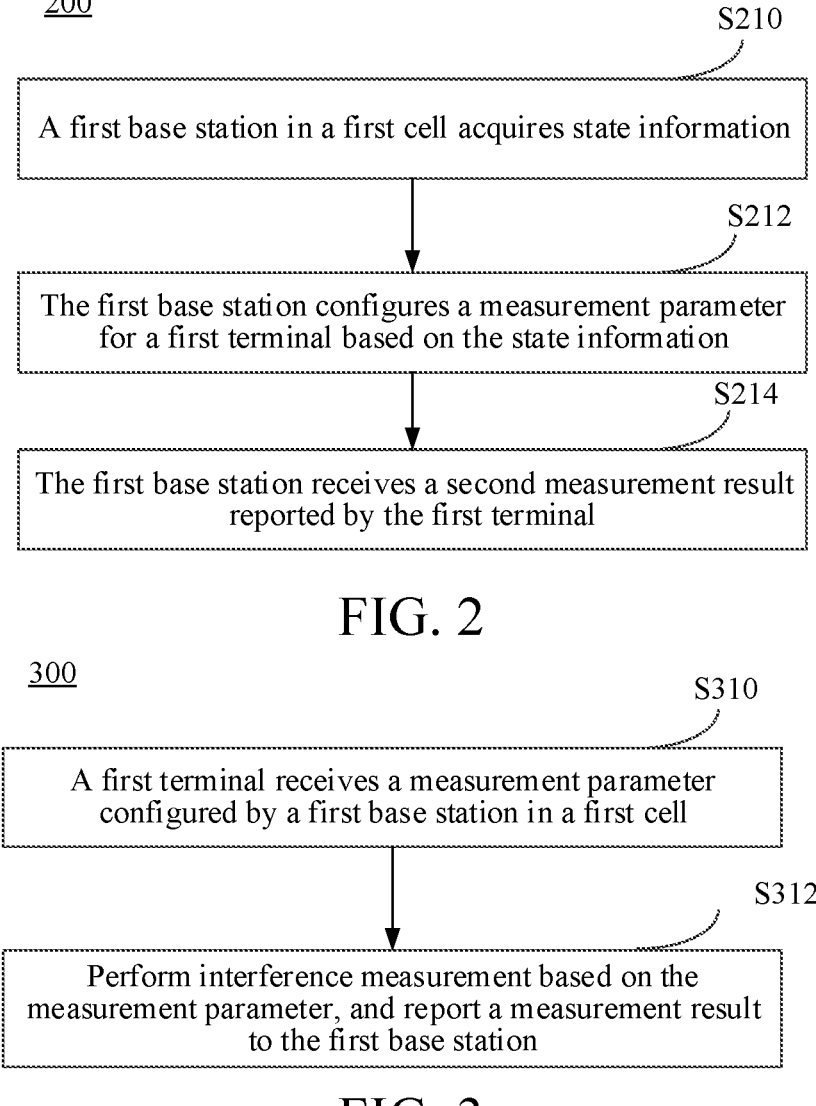
FIG. 2 is a flowchart of an interference measurement method according to an embodiment of this application.
FIG. 3 is another flowchart of an interference measurement method according to an embodiment of this application.

FIG. 2 is a schematic flowchart of an interference measurement method according to an embodiment of this application. The method 200 may be performed by a first base station in a first cell. In other words, the method may be performed by software or hardware installed on the first base station. As shown in FIG. 2, the method may include the following steps.

S210: The first base station in the first cell acquires state information. The state information includes at least one of the following: an operating parameter of a target wireless auxiliary device, configuration information of a reference signal of a second cell, and a first measurement result. The second cell is a neighboring cell of the first cell. The first measurement result is a measurement result obtained by measuring a reference signal of the first cell jointly by a second terminal in the second cell and the target wireless auxiliary device.

In this embodiment of this application, the target wireless auxiliary device may be a reconfigurable intelligent surface device, or may be a layer 1 (L1) relay device, or may be an L1 repeater or backscatter. The target wireless auxiliary device may have a beamforming function, or may not have a beamforming function. This is not specifically limited in this embodiment of this application.

S212: The first base station configures a measurement parameter for a first terminal based on the state information, where the measurement parameter includes a measurement object, the measurement object is used for assessing interference jointly caused by the second cell and the target wireless auxiliary device to the first terminal, and the first terminal is a terminal accessing the first cell.

In this embodiment of this application, the target wireless auxiliary device may include at least one of the following (1) to (3).

(1) First wireless auxiliary device The first wireless auxiliary device is controlled by a second base station in the second cell.

That is, the first wireless auxiliary device is controlled only by a current base station or operator. For example, the first base station in the first cell and the second base station in the neighboring second cell belong to the same operator and use the same frequency band, the two cells are adjacent in geographical locations, and the reconfigurable intelligent surface device is deployed at an edge location of the second cell to enhance edge coverage performance of the second cell.

For another example, the first base station in the first cell and the second base station in the neighboring second cell belong to different operators and use different frequency bands but are not far apart, coverage areas of the two cells may partially overlap, and the reconfigurable intelligent surface device is deployed in an overlapping area, and forwards a signal of the second cell and also affects a signal of the neighboring first cell.

For another example, the reconfigurable intelligent surface device is a device belonging to the second cell, and the first cell is a neighboring cell of the first cell. The first base station in the first cell and the second base station in the neighboring second cell belong to the same operator and use the same frequency band, the two cells are adjacent in geographical locations, and the reconfigurable intelligent surface device is deployed at an edge location of the second cell to enhance edge coverage performance of the second cell. Alternatively, the first base station in the first cell and the second base station in the neighboring second cell belong to different operators and use different frequency bands but are not far apart, coverage areas of the two cells may partially overlap, and the reconfigurable intelligent surface device is deployed in an overlapping area, and forwards a signal of the second cell and also affects a signal of the neighboring first cell.

(2) Second wireless auxiliary device The second wireless auxiliary device is controlled jointly by the first base station and the second base station.

That is, the second wireless auxiliary device belongs to a plurality of base stations and/or operators. The second wireless auxiliary device serves both the first cell and the second cell, and provides services for the first cell and the second cell in a time division multiplexing manner. That is, the second wireless auxiliary device is controlled by different cell (or base stations) in different time periods.

(3) Third wireless auxiliary device The third wireless auxiliary device is controlled jointly by the first base station and the second base station, and the third wireless auxiliary device provides services for the first cell and the second cell in a spatial multiplexing manner.

That is, the third wireless auxiliary device belongs to a plurality of base stations and/or operators. The third wireless auxiliary device serves both the first cell and the second cell, and provides services for the first cell and the second cell in a spatial multiplexing manner. That is, the third wireless auxiliary device provides services for different cells by using different space domain resources. Space domain resources may be divided based on at least one of the following: an antenna, an antenna element, an antenna panel, a transmitting/receiving unit, a beam, a layer, a rank, and an antenna angle. For example, the reconfigurable intelligent surface device may generate a matching forwarding beam for each of the first cell and the second cell based on a channel state, and forward communication signals of the first cell and the second cell by using different forwarding beams.

In a possible implementation, before S212, the method may further include: The first base station determines, based on the state information, whether a coverage area of the first cell is affected by the first wireless auxiliary device. In this possible implementation, the first base station determines, based on the state information, whether the coverage area of the first cell is affected by the first wireless auxiliary device, and may configure the measurement parameter of the first terminal based on a determining result. For example, if the coverage area of the first cell is affected by the first wireless auxiliary device, the measurement object may be configured to include at least one of the following (1) and (2).

(1) A second reference signal of the second cell in a plurality of measurement durations, where the first wireless auxiliary device forwards the second reference signal in different measurement durations by using different forwarding beams.

That is, the first wireless auxiliary device forwards the second reference signal in different measurement durations by using different forwarding beams. In this case, the measurement object configured by the first base station for the first terminal may include the second reference signal in the measurement durations. For example, the first wireless auxiliary device may forward, in different measurement durations by using different forwarding beams, a second reference signal broadcast by the second cell.

(2) A third reference signal of the second cell, where the third reference signal is a reference signal of the second terminal in the second cell, and the first wireless auxiliary device forwards the third reference signal by using one or more forwarding beams.

That is, the first wireless auxiliary device forwards the third reference signal to the second terminal by using a dedicated forwarding beam for the second terminal. In this case, the measurement object configured by the first base station for the first terminal may include the dedicated third reference signal of the second terminal.

Optionally, in the foregoing possible implementation, if the first base station determines that the coverage area of the first cell is affected by the first wireless auxiliary device, a transmit beam affected by the first wireless auxiliary device may be further determined based on the state information. For example, the first base station may roughly determine, based on location information of the first wireless auxiliary device, directions in which transmit beams are likely to be affected by the first wireless auxiliary device. Optionally, the first base station configures the measurement object only for a first terminal in an affected coverage area. That is, the first terminal is a terminal located in the affected coverage area.

In a possible implementation, the first base station may acquire the state information in at least one of the following manners (1) to (3).

(1) The first base station acquires the state information from the second base station.

For example, the first base station may acquire the state information from the second base station through an X2 interface. In this possible implementation, an operating state of the target wireless auxiliary device may include at least one of the following: location information of the first wireless auxiliary device, a first correspondence between a pattern set of the first wireless auxiliary device and a forwarding beam of the first wireless auxiliary device, and a time configuration corresponding to each pattern in the pattern set of the first wireless auxiliary device. The first measurement result may include an identifier of the first cell, and an identifier of the reference signal of the first cell.

In this possible implementation, the second base station may acquire the state information through the first wireless auxiliary device and/or a terminal accessing the second cell. For example, it is assumed that the first wireless auxiliary device is a reconfigurable intelligent surface device, and the reconfigurable intelligent surface device is controlled by a current base station in the second cell (namely, the second base station). Therefore, basic information of the reconfigurable intelligent surface device has been reported to the base station in the second cell. The basic information of the reconfigurable intelligent surface device may include but is not limited to: whether the reconfigurable intelligent surface device includes an active device, a location of the reconfigurable intelligent surface device, and a correspondence of a forwarding beam and/or a pattern set of the reconfigurable intelligent surface device (the correspondence may be predetermined through early training or network optimization and deployment). In this embodiment of this application, a pattern is overall information of an operating state of a device unit array of the reconfigurable intelligent surface device, and represents an operating state, of the device unit array, that corresponds to the reconfigurable intelligent surface device for implementing a specific forwarding beam. It may be understood that each pattern in the pattern set of the reconfigurable intelligent surface device is in a one-to-one correspondence with a forwarding beam. The reconfigurable intelligent surface device may have a communications module that is connected to the base station in the second cell in a wired or wireless manner, reports the pattern set of the reconfigurable intelligent surface, and switches a forwarding beam under the control of the base station in the second cell. It may be understood that the reconfigurable intelligent surface device selects specific patterns from the pattern set in different time periods to implement a corresponding beam forwarding function. Time configuration information corresponding to each pattern of the first wireless auxiliary device indicates an operating duration and an operating cycle of each forwarding beam of the first wireless auxiliary device.

Further, the base station in the second cell knows an approximate location of the reconfigurable intelligent surface, and the base station in the second cell may determine, based on the approximate location, a transmit beam directed to the reconfigurable intelligent surface device. Optionally, the base station in the second cell may further perform fine adjustment on the transmit beam based on channel information reported by the terminal in the second cell or the reconfigurable intelligent surface device, that is, generate a UE-specific forwarding beam. Alternatively, if an initial location of the reconfigurable intelligent surface device is unknown and the reconfigurable intelligent surface device includes only a passive device, the base station in the second cell determines, based on a channel measurement result reported by the terminal in the second cell, a transmit beam directed to the reconfigurable intelligent surface device. Alternatively, if an initial location of the reconfigurable intelligent surface device is unknown and the reconfigurable intelligent surface device includes a small number of active devices that can receive or transmit wireless signals, a corresponding transmit beam may be determined by measuring signals of different beams of the base station or transmitting a wireless signal.

In addition, if the reconfigurable intelligent surface device has some active devices, signals, such as SSBs, of different cells may be detected. The reconfigurable intelligent surface device detects a signal transmitted by the first cell, and reports the signal to the base station in the second cell. Reported information may include an ID of the first cell and/or an ID of a reference signal (SSB) of the first cell. In this case, it indicates that the base station in the first cell may be affected by the reconfigurable intelligent surface device, and the base station in the second cell transmits the reported information (namely, the first measurement result) to the base station in the first cell (namely, the first base station).

(2) The first base station receives a reporting message transmitted by the first terminal, where the reporting message carries the operating parameter.

For example, the first terminal may acquire an operating parameter of the first wireless auxiliary device by receiving a signal (or a modulated signal) transmitted by the first wireless auxiliary device. For example, the operating parameter may include identification information of the first wireless auxiliary device and/or identification information of the second cell corresponding to the first wireless auxiliary device. The first terminal reports the operating parameter to the first base station.

For example, it is assumed that the first wireless auxiliary device is a reconfigurable intelligent surface device, and the reconfigurable intelligent surface device has some active devices (or another signal modulation function). The terminal in the first cell acquires an ID of the reconfigurable intelligent surface device and/or ID information of a cell corresponding to the reconfigurable intelligent surface device by receiving a signal (or a modulated signal) transmitted by the reconfigurable intelligent surface. It indicates that the terminal in the first cell is affected by the reconfigurable intelligent surface. The terminal reports a message to the first cell. The message may include the ID of the reconfigurable intelligent surface that is received/detected by the UE, an ID of the corresponding cell, and whether the terminal is affected by the reconfigurable intelligent surface. For example, if the reconfigurable intelligent surface device has a phase modulation, spatial modulation, or index modulation function (index modulation) or has some transmission links, the reconfigurable intelligent surface device modulates a forwarded signal so that the forwarded signal carries the identification information of the reconfigurable intelligent surface device (for example, the ID of the reconfigurable intelligent surface device), or transmits, based on a predefined configuration or a configuration of the second cell, a wireless signal carrying the identification information of the reconfigurable intelligent surface device.

(3) The first base station receives a signal transmitted by the first wireless auxiliary device, and acquires the operating parameter based on the signal transmitted by the first wireless auxiliary device.

That is, in this possible implementation, the first base station may acquire an operating parameter of the first wireless auxiliary device by receiving a signal and/or information transmitted by the first wireless auxiliary device. The operating parameter may include identification information of the first wireless auxiliary device and/or identification information of the second cell corresponding to the first wireless auxiliary device.

For example, it is assumed that the first wireless auxiliary device is a reconfigurable intelligent surface device. The first base station receives a signal and/or information transmitted by the reconfigurable intelligent surface device, to obtain an identifier of the reconfigurable intelligent surface device and/or identification information of a cell corresponding to the reconfigurable intelligent surface device.

In another possible implementation of this embodiment of this application, the state information acquired by the first cell from the second base station may alternatively be a first measurement result provided by the second base station. The first measurement result includes at least one of the following: identification information of an eighth reference signal affected by the first wireless auxiliary device, a first correspondence between the eighth reference signal and a forwarding beam and/or a pattern set of the first wireless auxiliary device, and signal quality of the eighth reference signal. The eighth reference signal includes at least one of the following: a synchronization signal block (SSB) of the first cell, a tracking channel state information-reference signal (CSI-RS) of the first cell, and a UE-specific reference signal (RS) of the first cell.

The second terminal accessing the second cell may measure quality (namely, the first measurement result) of a reference signal of the first cell that is forwarded by the first wireless auxiliary device, and report the measurement result to the second base station. The second base station provides the first measurement result for the first base station.

In this possible implementation, optionally, the second terminal measures a reference signal (for example, a synchronization signal block SSB), of the first cell, that corresponds each forwarding beam and/or pattern set of the first wireless auxiliary device.

Optionally, before the measurement, the first cell may transmit reference signal and/or synchronization signal-related information of the first cell to the second base station, and the second base station transmits the reference signal/synchronization signal-related information of the first cell to the second terminal.

For example, assuming that the number of SSBs of the first cell is N and the number of forwarding beams of the first wireless auxiliary device is M, the second terminal needs to maintain a maximum of N×M measurement values. It is assumed that a measurement value exceeding a specific threshold among the N×M measurement values indicates that a corresponding SSB signal of the first cell can effectively cover an area of the second terminal. Among M measurement results corresponding to the same SSB in different forwarding beams, if a difference between the M measurement results exceeds a specific threshold value, it indicates that the SSB signal of the first cell is affected by the reconfigurable intelligent surface.

If a difference between the M measurement results is not large, it indicates that the signal of the first cell is not greatly affected by the first wireless auxiliary device. A possible reason is that the signal of the first cell is not radiated or is quite weakly radiated to the first wireless auxiliary device, or a signal, forwarded by the first wireless auxiliary device, of the signal of the first cell is not forwarded to the second terminal.

The second terminal reports a measurement result. The measurement result may include an ID of a corresponding SSB of the first cell, an ID of the first cell, and a measurement result (which may be all the M results, or optimal and/or worst several results) corresponding to the SSB and a forwarding beam of the first wireless auxiliary device. That is, a neighboring cell signal measurement result of the second terminal may be used as assistance information for performing interference measurement on the first wireless auxiliary device in the first cell.

The second cell provides information about the first wireless auxiliary device for the corresponding first cell. The information may include an ID of an SSB that may be affected, a forwarding beam and/or a pattern set of the first wireless auxiliary device, information about a corresponding reference signal, and a corresponding signal quality measurement result. It should be understood that the forwarding beam of the first wireless auxiliary device herein may be a broadcast forwarding beam or a forwarding beam temporarily generated to serve the specific second terminal.

Based on the acquired state information, the first base station may configure the measurement parameter of the first terminal accessing the first cell. In a possible realization, the measurement object includes but is not limited to at least one of the following (1) to (7).

(1) A plurality of first reference signals transmitted by the first cell, where different first reference signals correspond to different forwarding beams of the first wireless auxiliary device.

In this possible implementation, the number of first reference signals is not less than the number of forwarding beams of the first wireless auxiliary device.

Optionally, if the first base station determines, based on the state information, a transmit beam that may be affected by the first wireless auxiliary device in the foregoing possible implementation, the plurality of first reference signals transmitted by the first cell have the same transmit beam in this possible implementation, and the transmit beam and the determined transmit beam that is affected are quasi-co-located or are the same spatial filter.

(2) A second reference signal of the second cell in a plurality of measurement durations, where the first wireless auxiliary device forwards the second reference signal in different measurement durations by using different forwarding beams.

For example, if a forwarding beam of the first wireless auxiliary device is a predefined broadcast beam used for forwarding the second reference signal of the second cell, the first base station may configure a plurality of measurement durations for the first terminal to measure interference intensity under combinations of the second reference signal of the second cell and different forwarding beams of the first wireless auxiliary device.

(3) A third reference signal of the second cell, where the third reference signal is a reference signal of the second terminal in the second cell, and the first wireless auxiliary device forwards the third reference signal by using one or more forwarding beams.

For example, if the forwarding beam of the first wireless auxiliary device is a forwarding beam temporarily generated for a specific service of the second terminal, the first terminal needs to measure impact of operation of the service of the second terminal on the first terminal in a measurement duration. Therefore, a measurement configured by the first base station for the first terminal corresponds to a reference signal of the second terminal in the second cell.

(4) A plurality of fourth reference signals transmitted by the first cell, where different fourth reference signals correspond to different forwarding beams of the second wireless auxiliary device.

The measurement object is similar to that in (1). A difference lies in that, in this possible implementation, the second wireless auxiliary device provides services for the first cell and the second cell in different time periods. Therefore, in this possible implementation, the measurement object is a plurality of fourth reference signals transmitted by the first cell in a time period in which the second wireless auxiliary device provides services for the second cell.

(5) A fifth reference signal of the second cell in a plurality of measurement durations, where the second wireless auxiliary device broadcasts the fifth reference signal in different measurement durations by using different forwarding beams.

The measurement object is similar to that in (2). A difference lies in that, in this possible implementation, the second wireless auxiliary device provides services for the first cell and the second cell in different time periods. Therefore, in this possible implementation, the measurement object is the fifth reference signal transmitted by the second cell in a time period in which the second wireless auxiliary device provides services for the second cell.

(6) A sixth reference signal of the second cell, where the sixth reference signal is a reference signal of the second terminal in the second cell, and the second wireless auxiliary device forwards the sixth reference signal by using one or more forwarding beams.

The measurement object is similar to that in (3). A difference lies in that, in this possible implementation, the second wireless auxiliary device provides services for the first cell and the second cell in different time periods. Therefore, in this possible implementation, the measurement object is the sixth reference signal transmitted by the second cell in a time period in which the second wireless auxiliary device provides services for the second cell.

(7) A seventh reference signal of the second cell, where the seventh reference signal is a reference signal of the second cell, and the seventh reference signal is used for measuring a forwarding beam of the third wireless auxiliary device and/or training a forwarding beam of the third wireless auxiliary device.

It should be understood that the plurality of reference signals configured above are transmitted in different time periods, and the transmission time periods correspond to operating periods of a plurality of forwarding beams of the wireless auxiliary device. It should be further understood that, when measuring the foregoing reference signals, the first terminal may detect signal strength (an RSRP or an RSSI) of a reference signal of the first cell or the second cell in different time periods, and may also detect a signal to interference plus noise ratio (RSRQ) of a reference signal of the first cell affected by a reference signal of the second cell.

S214: The first base station receives a second measurement result reported by the first terminal, where the second measurement result is a result obtained by the first terminal by measuring the measurement object.

In a possible implementation of this embodiment of this application, after receiving the measurement parameter configured by the first base station, the first terminal measures the measurement object based on the measurement parameter, and reports a measurement result. The second measurement result may include signal quality of the foregoing measured reference signals in time periods corresponding to a plurality of operating states of the wireless auxiliary device.

In a possible implementation, after S214, the method may further include: The first base station performs interference coordination with the second base station based on the second measurement result, and schedules the first terminal based on a coordination result. In this possible implementation, the first base station performs interference coordination with the second base station based on the second measurement result, and schedules the first terminal based on the coordination result, thereby avoiding scheduling the first terminal in a case that the first terminal is affected, and improving utilization of a wireless spectrum.

In a possible implementation, the first base station may perform interference coordination according to the following step 1 to step 3, and schedule the first terminal based on a coordination result.

Step 1: The first base station determines, based on the second measurement result, whether signal quality of the first terminal is affected by the first wireless auxiliary device, and notifies the second base station of a determining result, so that the second base station can update an operating state of the first wireless auxiliary device based on the determining result.

For example, the first base station may determine whether a difference between measurement results of different reference signals is less than a preset threshold. If yes, it indicates that signal quality of the first terminal is slightly affected by the first wireless auxiliary device; otherwise, it indicates that signal quality of the first terminal is greatly affected by the first wireless auxiliary device, and the second base station needs to be notified.

Optionally, the first base station may divide, based on the second measurement result, forwarding beams and/or pattern sets of the first wireless auxiliary device into a plurality of groups, where the plurality of groups include a first group and a second group, the first group is a forwarding beam and/or a pattern set having a positive influence on the first cell, and the second group is a forwarding beam and/or a pattern set having a negative influence on the first cell; and the first base station notifies the second base station of the first group and/or the second group.

Step 2: The first base station receives an updated operating state of the first wireless auxiliary device, where the operating state of the first wireless auxiliary device includes time configuration information of each forwarding beam and/or pattern set of the first wireless auxiliary device.

To reduce interference, after receiving the determining result transmitted by the first base station, the second base station may configure a time for each forwarding beam and/or pattern set of the first wireless auxiliary device. For example, a time of using a forwarding beam with a negative influence may be reduced, to reduce impact of the first wireless auxiliary device on the first cell.

Step 3: The first base station schedules the first terminal based on the updated operating state of the first wireless auxiliary device.

For example, the first base station may schedule the first terminal in a time period corresponding to a forwarding beam with a positive influence, and avoid scheduling the first terminal in a time period corresponding to a forwarding beam with a negative influence.

In another possible implementation, that the first base station performs interference coordination with the second base station and schedules the first terminal based on the coordination result may include at least one of the following (1) and (2).

(1) If the first cell and the second cell use the same frequency band, the first base station performs interference coordination with the second base station based on the second measurement result, and controls the third wireless auxiliary device to generate a multi-forwarding beam pattern set, to reflect signals of the first base station and the second base station to different directions.

For example, if a cell A and a cell B use the same frequency band, to serve both the cell A and the cell B, the third wireless auxiliary device needs to generate a multi-beam pattern based on a measurement result, to reflect a signal of a base station in the cell A and a signal of a base station in the cell B to different directions. The multi-beam pattern of the reconfigurable intelligent surface may be generated based on measurement results reported by a terminal in the cell A and a terminal in the cell B.

(2) If the first cell and the second cell use different frequency bands, the first base station and the second base station determine terminals that need to be scheduled by the first base station and the second base station respectively in each pattern set of the third wireless auxiliary device, and jointly determine an operating state of the third wireless auxiliary device.

For example, if a cell A and a cell B use different frequency bands, the same pattern may serve both a terminal in the cell A and a terminal in the cell B. The cell A and the cell B determine terminals that need to be scheduled by the cell A and the cell B respectively in each pattern, and jointly determine an operating regularity of the pattern of the reconfigurable intelligent surface.

It should be noted that, although that the target wireless auxiliary device includes the second wireless auxiliary device is not described above in detail, it may be understood that a case in which the target wireless auxiliary device includes the second wireless auxiliary device is similar to the case in which the target wireless auxiliary device includes the first wireless auxiliary device. A difference lies in that, because the second wireless auxiliary device serves the first cell and the second cell in different time periods, in a case that the target wireless auxiliary device includes the second wireless auxiliary device, the first terminal measures interference to the first cell in a time period in which the second wireless auxiliary device provides services for the second cell. Correspondingly, during interference coordination, the first base station and the second base station may coordinate a time of a forwarding beam in the time period in which the second wireless auxiliary device provides services for the second cell. This is not described in this embodiment of this application again.

In the embodiments of this application, a first base station in a first cell acquires state information that includes at least one of the following: an operating parameter of a target wireless auxiliary device, configuration information of a reference signal of a second cell (that is, a neighboring cell of the first cell), and a first measurement result of the second cell for a wireless signal of the first cell; and then configures a measurement parameter for a first terminal based on the state information, where the configured measurement parameter includes a measurement object, and interference jointly caused by the second cell and the target wireless auxiliary device to the first terminal may be correspondingly indicated by measuring the measurement object; and then receives a measurement result obtained by the first terminal based on the measurement parameter. In this way, the first base station can acquire interference caused by the wireless auxiliary device to the first terminal, and then can schedule the first terminal based on the measurement result, to avoid additional impact on communication of the first cell due to deployment of the target wireless auxiliary device, and improve utilization of a wireless spectrum.

FIG. 3 is another schematic flowchart of an interference measurement method according to an embodiment of this application. The method 300 may be performed by a first terminal. In other words, the method may be performed by software or hardware installed on the first terminal. As shown in FIG. 3, the method may include the following steps.

S310: The first terminal receives a measurement parameter configured by a first base station in a first cell, where the measurement parameter includes a measurement object, the measurement object is used for assessing interference jointly caused by a second cell and a target wireless auxiliary device to the first terminal, the second cell is a neighboring cell of the first cell, and the first terminal is a terminal accessing the first cell.

The first base station may configure the measurement parameter for the first terminal in the manner described in the method 200. For details, refer to the descriptions of the method 200.

S312: Perform interference measurement based on the measurement parameter, and report a measurement result to the first base station, where the measurement result is a result obtained by the first terminal by measuring the measurement object.

The first terminal measures the measurement object based on the measurement parameter configured by the first base station, and reports the measurement result. The measurement result includes at least signal quality of each measurement object.

In a possible implementation, similar to that in the method 200, the target wireless auxiliary device includes at least one of the following:

a first wireless auxiliary device, where the first wireless auxiliary device is controlled by a second base station in the second cell;

a second wireless auxiliary device, where the second wireless auxiliary device is controlled jointly by the first base station and the second base station, and the second wireless auxiliary device provides services for the first cell and the second cell in a time division multiplexing manner; and a third wireless auxiliary device, where the third wireless auxiliary device is controlled jointly by the first base station and the second base station, and the third wireless auxiliary device provides services for the first cell and the second cell in a spatial multiplexing manner.

In a possible implementation, similar to that in the method 200, the measurement object includes at least one of the following:

a plurality of first reference signals transmitted by the first cell, where different first reference signals correspond to different forwarding beams of the first wireless auxiliary device;

a second reference signal of the second cell in a plurality of measurement durations, where the first wireless auxiliary device forwards the second reference signal in different measurement durations by using different forwarding beams;

a third reference signal of the second cell, where the third reference signal is a reference signal of the second terminal in the second cell, and the first wireless auxiliary device forwards the third reference signal by using one or more forwarding beams;

a plurality of fourth reference signals transmitted by the first cell, where different fourth reference signals correspond to different forwarding beams of the second wireless auxiliary device;

a fifth reference signal of the second cell in a plurality of measurement durations, where the second wireless auxiliary device broadcasts the fifth reference signal in different measurement durations by using different forwarding beams;

a sixth reference signal of the second cell, where the sixth reference signal is a reference signal of the second terminal in the second cell, and the second wireless auxiliary device forwards the sixth reference signal by using one or more forwarding beams; and a seventh reference signal of the second cell, where the seventh reference signal is a reference signal of the second cell, and the seventh reference signal is used for measuring a forwarding beam of the third wireless auxiliary device and/or training a forwarding beam of the third wireless auxiliary device.

The following describes the interference measurement method provided in the embodiments of this application by using an example in which a wireless auxiliary device is a reconfigurable intelligent surface device.

Embodiment 1

In this embodiment, the reconfigurable intelligent surface device is controlled only by a current base station/operator. For a terminal belonging to another adjacent base station/operator, a terminal in a neighboring cell is scheduled through a signal interference (which refers to interference of the reconfigurable intelligent surface device on the terminal in the neighboring cell in this embodiment) measurement process in combination with a time-domain configuration parameter of a beam of the reconfigurable intelligent surface device, to reduce impact of the reconfigurable intelligent surface device on a terminal belonging to another base station/operator.

In this embodiment, actual deployment of the reconfigurable intelligent surface device has the following possible cases:

(1) A base station in a cell A and a base station in a neighboring cell B belong to the same operator and use the same frequency band, the two cells are adjacent in geographical locations, and the reconfigurable intelligent surface device is deployed at an edge location of the cell to enhance edge coverage performance of the cell A.

(2) A base station in a cell A and a base station in a neighboring cell B belong to different operators and use different frequency bands but are not far apart, coverage areas of the two cells may partially overlap, and the reconfigurable intelligent surface device is deployed in an overlapping area, and forwards a signal of the cell A and also affects a signal of the neighboring cell B.

(3) The reconfigurable intelligent surface device is a device belonging to a cell A, a cell B is a neighboring cell of the cell A, and either of the foregoing cases is met.

In this embodiment, it is assumed that the reconfigurable intelligent surface device is controlled by a current base station in the cell A. Therefore, basic information of the reconfigurable intelligent surface device has been reported to the base station in the cell A (for example, whether the reconfigurable intelligent surface device includes an active device, and a location and a forwarding beam/pattern set of the reconfigurable intelligent surface device have been predetermined through early training or network optimization and deployment). A pattern is overall information of an operating state of a device unit array of the reconfigurable intelligent surface device, and represents an operating state, of the device unit array, that corresponds to the reconfigurable intelligent surface device for implementing a specific forwarding beam. It may be understood that a pattern and a forwarding beam of the reconfigurable intelligent surface device are in a one-to-one correspondence.

The reconfigurable intelligent surface device may have a communications module that is connected to the base station in the cell A in a wired or wireless manner, reports the pattern set of the reconfigurable intelligent surface device, and switches a forwarding beam under the control of the base station in the cell A.

In addition, it is assumed that the base station in the cell A has determined a location and a channel of the reconfigurable intelligent surface device and a transmit beam of the base station in the cell A.

In specific application, a deployment location of the reconfigurable intelligent surface device is determined based on optimization of a wireless propagation environment. The base station in the cell A knows an approximate location of the reconfigurable intelligent surface device; and the base station in the cell A determines, based on the approximate location, a transmit beam directed to the reconfigurable intelligent surface device, and optionally performs fine adjustment on the transmit beam based on channel information reported by a terminal in the cell A or the reconfigurable intelligent surface device, that is, generates a UE-specific forwarding beam.

Alternatively, an initial location of the reconfigurable intelligent surface device is unknown, the reconfigurable intelligent surface device includes only a passive device, and a terminal in the cell A reports a channel measurement result, to determine a transmit beam directed to the reconfigurable intelligent surface device.

Alternatively, an initial location of the reconfigurable intelligent surface device is unknown, the reconfigurable intelligent surface device includes a small number of active devices that can receive or transmit wireless signals, and a corresponding transmit beam is determined by measuring signals of different beams of the base station or transmitting a wireless signal.

Figure 4:
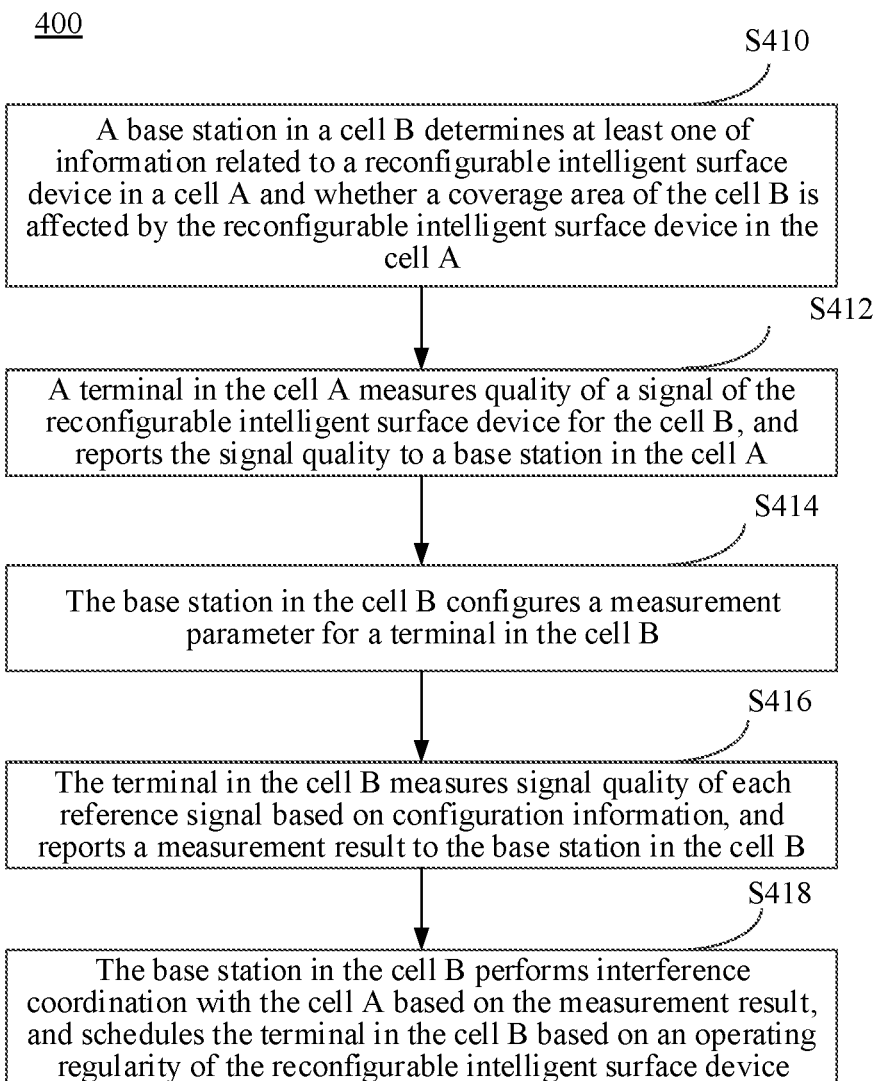
FIG. 4 is still another flowchart of an interference measurement method according to an embodiment of this application.

FIG. 4 is still another schematic flowchart of an interference measurement method according to an embodiment of this application. As shown in FIG. 4, the method may include the following steps S410 to S418.

S410: A base station in a cell B determines at least one of information related to a reconfigurable intelligent surface device in a cell A and whether a coverage area of the cell B is affected by the reconfigurable intelligent surface device in the cell A.

For example, the base station in the cell B may acquire at least one of the following information of the reconfigurable intelligent surface device in the cell A from a base station in the cell A through an X2 interface: location information of the reconfigurable intelligent surface device, a pattern set of the reconfigurable intelligent surface device and a corresponding time configuration, and RIS ID-related information. Based on an approximate location of the reconfigurable intelligent surface device, the base station in the cell B may determine directions in which transmit beams are affected.

If the reconfigurable intelligent surface device has some active devices, signals, such as SSBs, of different cells may be detected. The reconfigurable intelligent surface device detects a signal transmitted by the cell B, and reports the signal to the base station in the cell A. Reported information may include an ID of the cell B and/or an ID of a reference signal (SSB) of the cell B. It indicates that the base station in the cell B may be affected by the reconfigurable intelligent surface device.

Alternatively, the reconfigurable intelligent surface device has some active devices (or another signal modulation function). A terminal in the cell B acquires an ID of the reconfigurable intelligent surface device and/or ID information of a cell corresponding to the reconfigurable intelligent surface device by receiving a signal (or a modulated signal) transmitted by the reconfigurable intelligent surface device. It indicates that the terminal in the cell B is affected by the reconfigurable intelligent surface device. The terminal reports a message to the cell B. The message may include the ID of the reconfigurable intelligent surface device that is received/detected by the UE, an ID of the corresponding cell, and whether the terminal is affected by the reconfigurable intelligent surface device.

Alternatively, the base station in the cell B receives a signal/information transmitted by the RIS (active), to obtain an identifier of the reconfigurable intelligent surface device and/or ID information of a cell corresponding to the reconfigurable intelligent surface device.

S412: A terminal in the cell A measures quality of a signal of the reconfigurable intelligent surface device for the cell B, and reports the signal quality to the base station in the cell A. The base station in the cell A transmits, to the base station in the cell B, information reported by the terminal in the cell A.

This step is an optional step.

The terminal in the cell A measures signal quality of a reference signal (for example, a synchronization signal block SSB) of the cell B in each forwarding beam/pattern of the reconfigurable intelligent surface device.

Before the measurement, the base station in the cell B may transmit reference signal/synchronization signal-related information of the cell B to the base station in the cell A, and the base station in the cell A transmits the reference signal/synchronization signal-related information of the cell B to the terminal in the cell A.

Assuming that the number of SSBs of the cell B is N and the number of forwarding beams of the reconfigurable intelligent surface device is M, the terminal in the cell A needs to maintain a maximum of N×M measurement values. A measurement value exceeding a specific threshold among the N×M measurement values indicates that a corresponding SSB signal of the cell B can effectively cover an area of the terminal in the cell A. Among M measurement results corresponding to the same SSB in different forwarding beams, if a difference between the M measurement results exceeds a specific threshold value, it indicates that the SSB signal of the cell B is affected by the reconfigurable intelligent surface device.

If a difference between the M measurement results is not large, it indicates that the signal of the cell B is not greatly affected by the reconfigurable intelligent surface device. A possible reason is that the signal of the cell B is not radiated or is quite weakly radiated to the reconfigurable intelligent surface device, or a signal, forwarded by the reconfigurable intelligent surface device, of the signal of the cell B is not forwarded to the terminal in the cell A.

A measurement result reported by the terminal in the cell A may include an ID of a corresponding SSB of the cell B, an ID of the cell B, and a measurement result (which may be all the M results, or optimal and/or worst several results) corresponding to the SSB and a forwarding beam of the reconfigurable intelligent surface device. That is, a neighboring cell signal measurement result of the terminal in the cell A may be used as assistance information for performing interference measurement on the reconfigurable intelligent surface device in the cell B.

The base station in the cell A provides information about the reconfigurable intelligent surface device for the base station in the cell B. The information may include an ID of an SSB that may be affected, a forwarding beam/pattern of the reconfigurable intelligent surface device, information about a corresponding reference signal, and a corresponding signal quality measurement result. It should be understood that the forwarding beam of the reconfigurable intelligent surface device herein may be a broadcast forwarding beam or a forwarding beam temporarily generated to serve the specific terminal in the cell A.

S414: The base station in the cell B configures a measurement parameter for a terminal in the cell B.

The measurement parameter configured by the base station in the cell B for the terminal in the cell B is used for measuring and assessing impact of the reconfigurable intelligent surface device on a signal of the cell B, and measuring and assessing impact of a signal of the cell A in combination with the reconfigurable intelligent surface device on a signal of the terminal in the cell B.

The base station in the cell B transmits configuration information to the terminal in the cell B, and the configuration information includes at least configuration information of a plurality of to-be-measured reference signals. The to-be-measured reference signals may be reference signals transmitted by the cell B, and the number of to-be-measured reference signals is not less than the number of determined forwarding beams of the reconfigurable intelligent surface device. In addition, the to-be-measured reference signals have the same transmit beam and are quasi-co-located with a reference signal that may be affected and that is determined in the foregoing steps. Different reference signals correspond to different forwarding beams of the reconfigurable intelligent surface device. Impact of the reconfigurable intelligent surface device on the signal of the cell B may be assessed by measuring the plurality of to-be-measured reference signals.

In addition, the configuration information transmitted by the base station in the cell B to the terminal in the cell B may further include:

(1) If the forwarding beam of the reconfigurable intelligent surface device is a predefined broadcast beam used for forwarding an SSB signal of the cell A, the cell B configures a plurality of measurement durations for the terminal in the cell B to measure interference intensity under combinations of the SSB of the cell A and different forwarding beams of the reconfigurable intelligent surface device.

(2) If the forwarding beam of the reconfigurable intelligent surface device is a forwarding beam temporarily generated for a specific service of the terminal in the cell A, the cell B configures a measurement duration for the terminal in the cell B to measure impact of operation of the service of the terminal in the cell A on the terminal in the cell B. A corresponding measured reference signal may be a CSI-RS, a DMRS, or an SSB of the terminal in the cell A. If there are a plurality of alternative forwarding beams, the terminal in the cell B separately measures corresponding reference signals.

S416: The terminal in the cell B measures signal quality of each reference signal based on the configuration information, and reports a measurement result to the base station in the cell B.

The terminal in the cell B does not need to know specific information of the reconfigurable intelligent surface device. The base station in the cell B determines impact of the reconfigurable intelligent surface device on the terminal in the cell B based on a correspondence between a reference signal and the reconfigurable intelligent surface device.

S418: The base station in the cell B performs interference coordination with the cell A based on the measurement result, and schedules the terminal in the cell B based on an operating regularity of the reconfigurable intelligent surface device.

The base station in the cell B may determine, based on the measurement result, whether signal quality of the terminal in the cell B is affected by the reconfigurable intelligent surface device. A possible criterion is that a difference between different measurement results is less than a specific threshold, which indicates impact is small; otherwise, it indicates that impact is large.

If the terminal in the cell B is greatly affected by the reconfigurable intelligent surface device, the base station in the cell B may classify forwarding beams/patterns of the reconfigurable intelligent surface device into a forwarding beam with a positive influence on the cell B, and a forwarding beam with a negative influence on the cell B. A possible criterion is that a mean value of all measurement results is used as a threshold, and a forwarding beam above the threshold is considered as having a positive influence; otherwise, a forwarding beam is considered as having a negative influence.

The base station in the cell B notifies the cell A of the forwarding beam with a negative influence, to assist the cell A in performing interference measurement. In principle, the cell A reduces a time of using the forwarding beam with a negative influence, to reduce impact on the cell B.

The cell B schedules a terminal in a time period of the forwarding beam with a negative influence based on an operating regularity, provided by the cell A, of the forwarding beam of the reconfigurable intelligent surface device (that is, the cell A transmits, to the cell B, an updated per-RIS pattern set of the reconfigurable intelligent surface device and a corresponding time configuration), and avoids, as far as possible, scheduling an affected terminal in a time period of the forwarding beam with a negative influence.

Embodiment 2

In this embodiment, a reconfigurable intelligent surface device belongs to a plurality of base stations/operators, and an overall system configuration is determined by using a result of beam training and interference measurement, including but not limited to a pattern of the reconfigurable intelligent surface device and a scheduling configuration of a terminal belonging to each base station/operator.

In this embodiment, a base station in a cell A and a base station in a cell B allocate signal measurement resources to a terminal in the cell A and a terminal in the cell B respectively, to measure signals of the cell A and the cell B.

The cell A is used as an example. The terminal in the cell A needs to measure a signal of the base station in the cell A and a signal of the base station in the cell B in each pattern of the reconfigurable intelligent surface device.

Because the reconfigurable intelligent surface device serves the two cells, the base station in the cell A and the base station in the cell B s know a location of the reconfigurable intelligent surface device, and may determine respective transmit beams directed to the reconfigurable intelligent surface device.

In actual application, a pattern in which the reconfigurable intelligent surface device serves the two cell may be time division multiplexing or spatial multiplexing. For time division multiplexing, the reconfigurable intelligent surface device is controlled by different cells in different time periods. An interference measurement and coordination method in this case is similar to that in Embodiment 1. For details, see Embodiment 1. For spatial multiplexing, the reconfigurable intelligent surface device generates matching forwarding beams for the user in the cell A and the user in the cell B based on a channel condition, so that the terminals in the two cells perform communication in the case of controllable interference.

That the pattern in which the reconfigurable intelligent surface device serves the two cells is spatial multiplexing is used as an example below for description.

FIG. 5 is still another schematic flowchart of an interference measurement method according to an embodiment of this application. As shown in FIG. 5, the method mainly includes the following steps S510 to S514.

S510: A terminal in a cell A measures a plurality of reference signals transmitted by a base station in the cell A, where the plurality of reference signals use the same transmit beam, and the reference signals correspond to different forwarding beams of a reconfigurable intelligent surface device. The terminal in the cell A reports a measurement result of the plurality of reference signals to the base station in the cell A.

S512: The base station in the cell A acquires a reference signal of a base station in a cell B through interaction between the base stations, and provides, for the base station in the cell B, reference signals (namely, the plurality of reference signals) of the cell A that are used for measuring/training forwarding beams of the reconfigurable intelligent surface device.

After acquiring the reference signal of the base station in the cell B, the base station in the cell A may configure a corresponding measurement resource for the terminal in the cell A, to measure signal quality of the base station in the cell B. The terminal in the cell A reports a measurement result of the reference signal of the cell B to the base station in the cell A.

The reference signal transmitted by the base station in the cell B corresponds to a plurality of forwarding beams of the reconfigurable intelligent surface device, and a forwarding beam for the cell A is not necessarily the same as a forwarding beam for the cell B.

Measurement behavior of a terminal in the cell B is similar to that of the terminal in the cell A.

S514: The cell A and the cell B determine a reflected beam of the reconfigurable intelligent surface device based on a measurement result, and schedule a matching terminal.

Based on a spectrum status of the cell A and the cell B, there may be different matching manners. For example, the following two schemes may be used:

(1) If the cell A and the cell B use the same frequency band, to serve both the cell A and the cell B, the reconfigurable intelligent surface device needs to generate a multi-beam pattern based on a measurement result, to reflect a signal of the base station in the cell A and a signal of the base station in the cell B to different directions. The multi-beam pattern of the reconfigurable intelligent surface device is generated based on measurement results reported by the terminal in the cell A and the terminal in the cell B.

(2) If the cell A and the cell B use different frequency bands, the same pattern may serve both the terminal in the cell A and the terminal in the cell B. The cell A and the cell B determine terminals that need to be scheduled by the cell A and the cell B respectively in each pattern, and jointly determine an operating regularity of the pattern of the reconfigurable intelligent surface device.

In the technical solutions provided in the embodiments of this application, a process of jointly measuring, by a plurality of cells, impact of a reconfigurable intelligent surface on signal quality of terminals is provided, and a scheduling policy for the reconfigurable intelligent surface is designed based on a measurement result. Adjacent cells determine whether coverage areas are affected by a reconfigurable intelligent surface device. A possible manner includes: information exchange in a current cell, automatic discovery and reporting by a terminal, and active reporting by the reconfigurable intelligent surface device. The adjacent cells configure time-frequency measurement resources for terminals within the coverage areas of the cells, to measure a relationship between an operating state of the reconfigurable intelligent surface and quality of a signal of a current cell and a signal of an adjacent cell. The adjacent cells perform an interference coordination operation based on a measurement result, for example, exchange an interference status with a current cell and perform coordination, schedule a terminal based on the interference status, and optimize an operating state of the reconfigurable intelligent surface.

It should be noted that the interference measurement method provided in the embodiments of this application may be performed by an interference measurement apparatus, or by a control module that is in the interference measurement apparatus and that is configured to perform the interference measurement method. In the embodiments of this application, an interference measurement apparatus provided in the embodiments of this application is described by using an example in which the interference measurement apparatus performs the interference measurement method.

FIG. 6 is a schematic structural diagram of an interference measurement apparatus according to an embodiment of this application. The interference measurement apparatus 600 may be applied to a first base station in a first cell.

As shown in FIG. 6, the apparatus 600 includes: an acquisition module 601, configured to acquire state information, where the state information includes at least one of the following: an operating parameter of a target wireless auxiliary device, configuration information of a reference signal of a second cell, and a first measurement result, the second cell is a neighboring cell of the first cell, and the first measurement result is a measurement result obtained by measuring a reference signal of the first cell jointly by a second terminal in the second cell and the target wireless auxiliary device; a configuration module 602, configured to configure a measurement parameter for a first terminal based on the state information, where the measurement parameter includes a measurement object, the measurement object is used for assessing interference jointly caused by the second cell and the target wireless auxiliary device to the first terminal, and the first terminal is a terminal accessing the first cell; and a receiving module 603, configured to receive a second measurement result reported by the first terminal, where the second measurement result is a result obtained by the first terminal by measuring the measurement object.

In a possible implementation, the target wireless auxiliary device includes at least one of the following:

a first wireless auxiliary device, where the first wireless auxiliary device is controlled by a second base station in the second cell;

a second wireless auxiliary device, where the second wireless auxiliary device is controlled jointly by the first base station and the second base station, and the second wireless auxiliary device provides services for the first cell and the second cell in a time division multiplexing manner; and a third wireless auxiliary device, where the third wireless auxiliary device is controlled jointly by the first base station and the second base station, and the third wireless auxiliary device provides services for the first cell and the second cell in a spatial multiplexing manner.

In a possible implementation, the measurement object includes at least one of the following:

a plurality of first reference signals transmitted by the first cell, where different first reference signals correspond to different forwarding beams of the first wireless auxiliary device;

a second reference signal of the second cell in a plurality of measurement durations, where the first wireless auxiliary device forwards the second reference signal in different measurement durations by using different forwarding beams;

a third reference signal of the second cell, where the third reference signal is a reference signal of the second terminal in the second cell, and the first wireless auxiliary device forwards the third reference signal by using one or more forwarding beams;

a plurality of fourth reference signals transmitted by the first cell, where different fourth reference signals correspond to different forwarding beams of the second wireless auxiliary device;

a fifth reference signal of the second cell in a plurality of measurement durations, where the second wireless auxiliary device broadcasts the fifth reference signal in different measurement durations by using different forwarding beams;

a sixth reference signal of the second cell, where the sixth reference signal is a reference signal of the second terminal in the second cell, and the second wireless auxiliary device forwards the sixth reference signal by using one or more forwarding beams; and a seventh reference signal of the second cell, where the seventh reference signal is a reference signal of the second cell, and the seventh reference signal is used for measuring a forwarding beam of the third wireless auxiliary device and/or training a forwarding beam of the third wireless auxiliary device.

In a possible implementation, the configuration module 602 is further configured to determine, based on the state information, whether a coverage area of the first cell is affected by the first wireless auxiliary device.

In a possible implementation, that the acquisition module 601 acquires the state information includes at least one of the following:

acquiring the state information from the second base station;

receiving a reporting message transmitted by the first terminal, where the reporting message carries the operating parameter; or receiving the operating parameter transmitted by the first wireless auxiliary device.

In a possible implementation, an operating parameter of the first wireless auxiliary device includes at least one of the following: an identifier of the first wireless auxiliary device, an identifier of the second cell corresponding to the first wireless auxiliary device, location information of the first wireless auxiliary device, a first correspondence between each pattern in a pattern set of the first wireless auxiliary device and a forwarding beam of the first wireless auxiliary device, and a time configuration corresponding to each pattern set of the first wireless auxiliary device; and the first measurement result includes at least one of the following: an identifier of the first cell, and an identifier of the reference signal of the first cell.

In a possible implementation, that the acquisition module 601 acquires the state information includes:

receiving the first measurement result provided by the second base station, where the first measurement result includes at least one of the following: identification information of an eighth reference signal affected by the first wireless auxiliary device, a first correspondence between the eighth reference signal and a forwarding beam and/or a pattern set of the first wireless auxiliary device, and signal quality of the eighth reference signal, and the eighth reference signal includes at least one of the following: a synchronization signal block SSB of the first cell, a tracking channel state information-reference signal CSI-RS of the first cell, and a UE-specific reference signal RS of the first cell.

In a possible implementation, the forwarding beam in the first correspondence includes a forwarding beam used by the first wireless auxiliary device for broadcasting, or a forwarding beam used by the first wireless auxiliary device for serving the specified second terminal.

In a possible implementation, as shown in FIG. 6, the apparatus may further include a scheduling module 604, configured to performs interference coordination with the second base station based on the second measurement result, and schedule the first terminal based on a coordination result.

In a possible implementation, that the scheduling module 604 performs interference coordination with the second base station based on the second measurement result, and schedules the first terminal based on the coordination result includes:

determining, based on the second measurement result, whether signal quality of the first terminal is affected by the first wireless auxiliary device, and notifying the second base station of a determining result, so that the second base station can update an operating state of the first wireless auxiliary device based on the determining result;

receiving an updated operating state of the first wireless auxiliary device, where the operating state of the first wireless auxiliary device includes time configuration information of each forwarding beam and/or pattern set of the first wireless auxiliary device; and scheduling the first terminal based on the updated operating state of the first wireless auxiliary device.

In a possible implementation, that the scheduling module 604 determines, based on the second measurement result, whether the signal quality of the first terminal is affected by the first wireless auxiliary device, and notifies the second base station of the determining result includes:

dividing, based on the second measurement result, forwarding beams and/or pattern sets of the first wireless auxiliary device into a plurality of groups, where the plurality of groups include a first group and a second group, the first group is a forwarding beam and/or a pattern set having a positive influence on the first cell, and the second group is a forwarding beam and/or a pattern set having a negative influence on the first cell; and notifying the second base station of the first group and/or the second group.

In a possible implementation, that the scheduling module 604 performs interference coordination with the second base station based on the second measurement result, and schedules the first terminal based on the coordination result includes:

if the first cell and the second cell use the same frequency band, performing interference coordination with the second base station based on the second measurement result, and controlling the third wireless auxiliary device to generate a multi-forwarding beam pattern set, to reflect signals of the first base station and the second base station to different directions; and/or if the first cell and the second cell use different frequency bands, determining, with the second base station, terminals that need to be scheduled by the apparatus and the second base station respectively in each pattern set of the third wireless auxiliary device, and jointly determining an operating state of the third wireless auxiliary device.

The interference measurement apparatus in this embodiment of this application may be an apparatus, or may be a component, an integrated circuit, or a chip in a base station. For example, the base station may include but is not limited to the aforementioned types of the network side device 12. This is not specifically limited in this embodiment of this application.

The interference measurement apparatus in this embodiment of this application may be an apparatus with an operating system. The operating system may be an Android operating system, may be an iOS operating system, or may be another possible operating system. This is not specifically limited in this embodiment of this application.

The interference measurement apparatus provided in this embodiment of this application is capable of implementing the processes implemented by the base station in the method embodiments of FIG. 2 to FIG. 5, with the same technical effects achieved. To avoid repetition, details are not described herein again.

Figure 7:
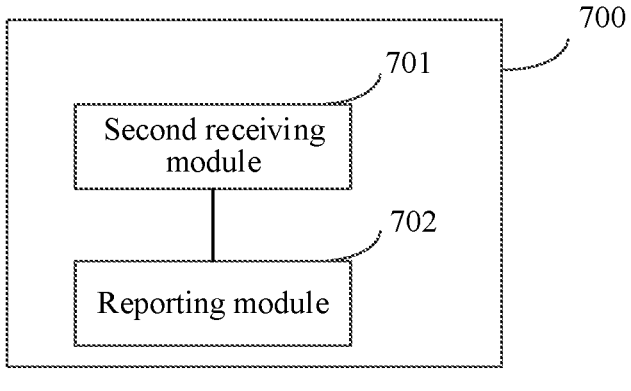
FIG. 7 is another schematic structural diagram of an interference measurement apparatus according to an embodiment of this application.

FIG. 7 is another schematic structural diagram of an interference measurement apparatus according to an embodiment of this application.

As shown in FIG. 7, the interference measurement apparatus 700 may include: a second receiving module 701, configured to receive a measurement parameter configured by a first base station in a first cell, where the measurement parameter includes a measurement object, the measurement object is used for assessing interference jointly caused by a second cell and a target wireless auxiliary device to the first terminal, the second cell is a neighboring cell of the first cell, and the first terminal is a terminal accessing the first cell; and a reporting module 702, configured to perform interference measurement based on the measurement parameter, and report a measurement result to the first base station, where the measurement result is a result obtained by the first terminal by measuring the measurement object.

In a possible implementation, the target wireless auxiliary device includes at least one of the following:

a first wireless auxiliary device, where the first wireless auxiliary device is controlled by a second base station in the second cell;

a second wireless auxiliary device, where the second wireless auxiliary device is controlled jointly by the first base station and the second base station, and the second wireless auxiliary device provides services for the first cell and the second cell in a time division multiplexing manner; and a third wireless auxiliary device, where the third wireless auxiliary device is controlled jointly by the first base station and the second base station, and the third wireless auxiliary device provides services for the first cell and the second cell in a spatial multiplexing manner.

In a possible implementation, the measurement object includes at least one of the following:

a plurality of first reference signals transmitted by the first cell, where different first reference signals correspond to different forwarding beams of the first wireless auxiliary device;

a second reference signal of the second cell in a plurality of measurement durations, where the first wireless auxiliary device forwards the second reference signal in different measurement durations by using different forwarding beams;

a third reference signal of the second cell, where the third reference signal is a reference signal of the second terminal in the second cell, and the first wireless auxiliary device forwards the third reference signal by using one or more forwarding beams;

a plurality of fourth reference signals transmitted by the first cell, where different fourth reference signals correspond to different forwarding beams of the second wireless auxiliary device;

a fifth reference signal of the second cell in a plurality of measurement durations, where the second wireless auxiliary device broadcasts the fifth reference signal in different measurement durations by using different forwarding beams;

a sixth reference signal of the second cell, where the sixth reference signal is a reference signal of the second terminal in the second cell, and the second wireless auxiliary device forwards the sixth reference signal by using one or more forwarding beams; and a seventh reference signal of the second cell, where the seventh reference signal is a reference signal of the second cell, and the seventh reference signal is used for measuring a forwarding beam of the third wireless auxiliary device and/or training a forwarding beam of the third wireless auxiliary device.

The interference measurement apparatus in this embodiment of this application may be an apparatus, or may be a component, an integrated circuit, or a chip in a terminal. The apparatus may be a mobile terminal or a non-mobile terminal. For example, the mobile terminal may include but is not limited to the aforementioned types of the terminal 11, and the non-mobile terminal may be a server, a network attached storage (NAS), a personal computer (PC), a television (TV), a teller machine, a self-service machine, or the like. This is not specifically limited in this embodiment of this application.

The interference measurement apparatus in this embodiment of this application may be an apparatus with an operating system. The operating system may be an Android operating system, may be an iOS operating system, or may be another possible operating system. This is not specifically limited in this embodiment of this application.

The interference measurement apparatus provided in this embodiment of this application is capable of implementing the processes implemented by the terminal in the method embodiments of FIG. 2 to FIG. 5, with the same technical effects achieved. To avoid repetition, details are not described herein again.

Figure 8:
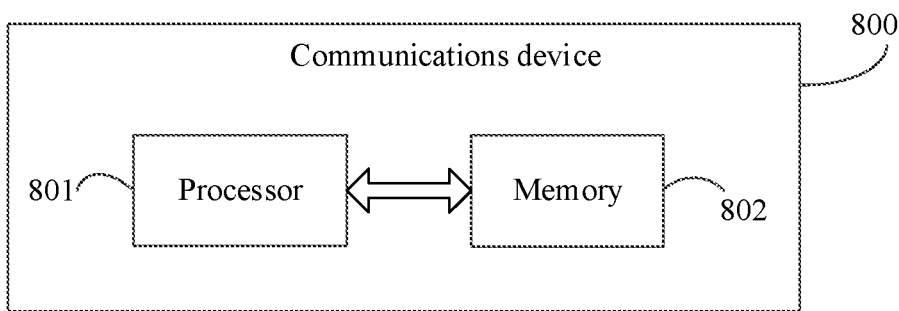
FIG. 8 is a schematic structural diagram of a communications device according to an embodiment of this application.

Optionally, as shown in FIG. 8, an embodiment of this application further provides a communications device 800, including a processor 801, a memory 802, and a program or instructions stored in the memory 802 and capable of running on the processor 801. For example, when the communications device 800 is a terminal, and when the program or instructions are executed by the processor 801, the processes of the embodiments of the interference measurement method are implemented, with the same technical effects achieved. When the communications device 800 is a network side device, and when the program or instructions are executed by the processor 801, the processes of the embodiments of the interference measurement method are implemented, with the same technical effects achieved. To avoid repetition, details are not described herein again.

Figure 9:
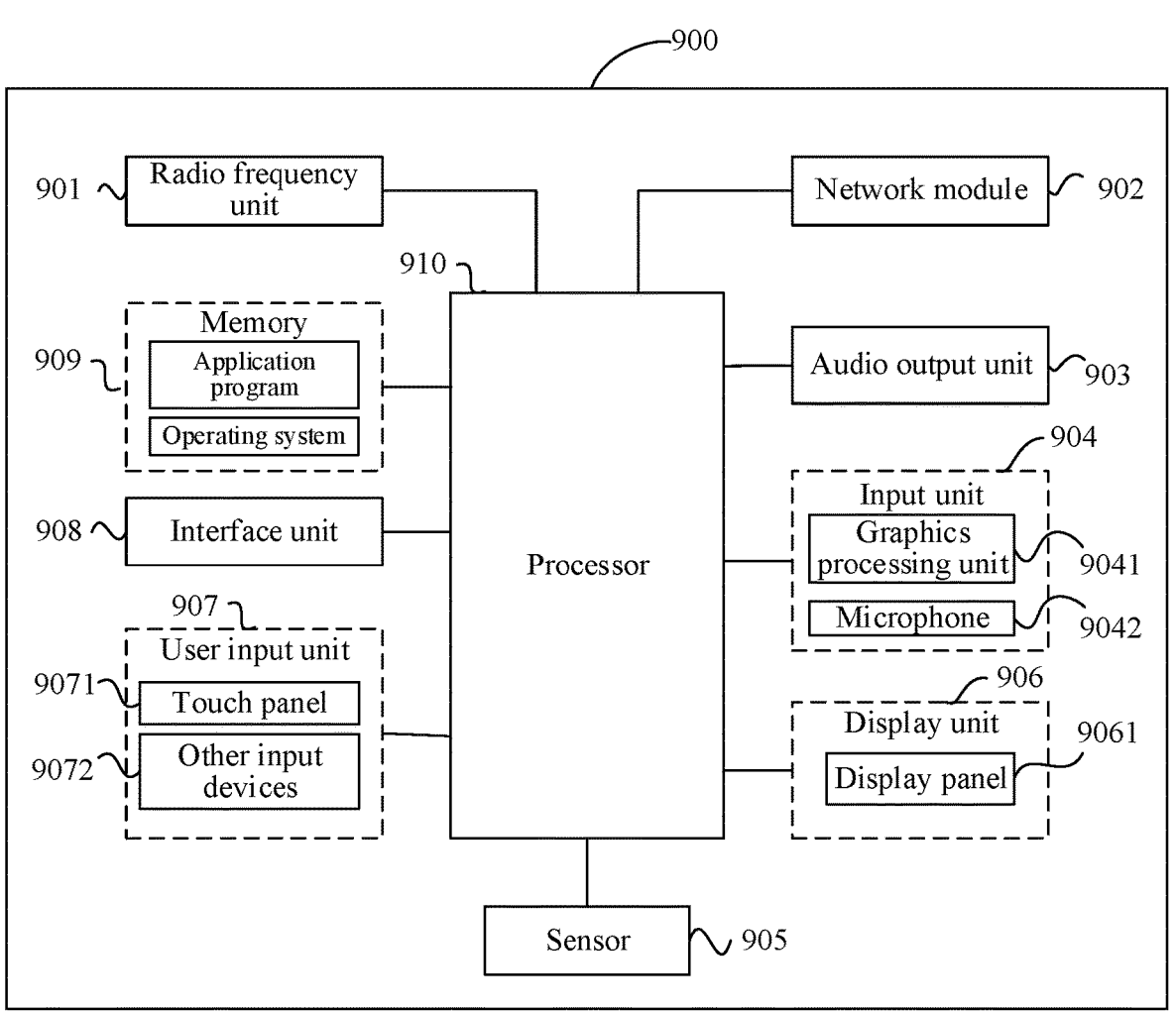
FIG. 9 is a schematic diagram of a hardware structure of a terminal according to an embodiment of this application.

FIG. 9 is a schematic diagram of a hardware structure of a terminal for implementing an embodiment of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

Persons skilled in the art can understand that the terminal 900 may further include a power supply (for example, a battery) that supplies power to each component. The power supply may be logically connected to the processor 910 by using a power management system, to implement functions such as charging management, discharging management, and power consumption management by using the power management system. The terminal structure shown in FIG. 9 does not constitute a limitation on the terminal. The terminal may include more or fewer components than those shown in the figure, or some components may be combined, or there may be a different component layout. Details are not described herein again It should be understood that, in this embodiment of this application, the input unit 904 may include a graphics processing unit (GPU) 9041 and a microphone 9042. The graphics processing unit 9041 processes image data of a static picture or a video that is obtained by an image capture apparatus (for example, a camera) in a video capture mode or an image capture mode. The display unit 906 may include the display panel 9061. The display panel 9061 may be configured in a form of a liquid crystal display, an organic light-emitting diode, or the like. The user input unit 907 includes a touch panel 9071 and other input devices 9072. The touch panel 9071 is also referred to as a touchscreen. The touch panel 9071 may include two parts: a touch detection apparatus and a touch controller. The other input devices 9072 may include but are not limited to a physical keyboard, a function key (such as a volume control key or an on/off key), a trackball, a mouse, and a joystick. Details are not described herein.

In this embodiment of this application, the radio frequency unit 901 receives downlink data from a network side device and then transmits the downlink data to the processor 910 for processing; and transmits uplink data to the network side device. Usually, the radio frequency unit 901 includes but is not limited to an antenna, at least one amplifier, a transceiver, a coupler, a low noise amplifier, a duplexer, and the like.

The memory 909 may be configured to store software programs or instructions and various data. The memory 909 may mainly include a program or instruction storage region and a data storage region. The program or instruction storage region may store an operating system, an application program or instructions required by at least one function (for example, an audio play function or an image play function), and the like. In addition, the memory 909 may include a high-speed random access memory, or may include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash memory device, or another non-volatile solid-state storage device.

The processor 910 may include one or more processing units. Optionally, the processor 910 may integrate an application processor and a modem processor. The application processor mainly processes an operating system, a user interface, an application program or instructions, and the like. The modem processor mainly processes wireless communication, for example, a baseband processor. It may be understood that the modem processor may alternatively not be integrated in the processor 910.

The radio frequency unit 901 is configured to receive a measurement parameter configured by a first base station in a first cell, where the measurement parameter includes a measurement object, the measurement object is used for assessing interference jointly caused by a second cell and a target wireless auxiliary device to the first terminal, the second cell is a neighboring cell of the first cell, and the first terminal is a terminal accessing the first cell.

The processor 910 is configured to perform interference measurement based on the measurement parameter.

The radio frequency unit 901 is further configured to report a measurement result to the first base station, where the measurement result is a result obtained by the first terminal by measuring the measurement object.

Figure 10:
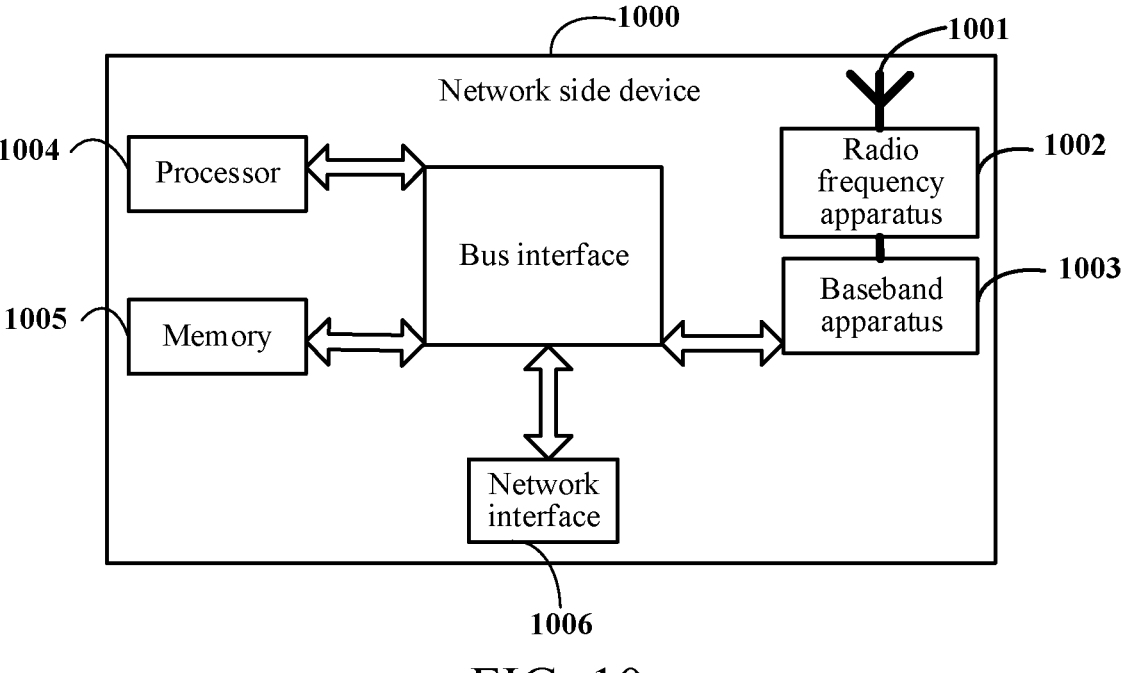
FIG. 10 is a schematic diagram of a hardware structure of a network side device according to an embodiment of this application.

Specifically, an embodiment of this application further provides a network side device. As shown in FIG. 10, the network side device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and transmits the received information to the baseband apparatus 1003 for processing. In a downlink direction, the baseband apparatus 1003 processes to-be-transmitted information, and transmits the information to the radio frequency apparatus 1002; and the radio frequency apparatus 1002 processes the received information and then transmits the information by using the antenna 1001.

The frequency band processing apparatus may be located in the baseband apparatus 1003. The method performed by the network side device in the foregoing embodiments may be implemented by the baseband apparatus 1003, and the baseband apparatus 1003 includes a processor 1004 and a memory 1005.

The baseband apparatus 1003 may include, for example, at least one baseband processing unit, where a plurality of chips are disposed on the baseband processing unit. As shown in FIG. 10, one of the chips is, for example, the processor 1004, and connected to the memory 1005, to invoke the program in the memory 1005 to perform the operations of the network device shown in the foregoing method embodiment.

The baseband apparatus 1003 may further include a network interface 1006, configured to exchange information with the radio frequency apparatus 1002. The interface is, for example, a common public radio interface (CPRI).

Specifically, the network side device in this embodiment of the present disclosure further includes instructions or a program stored in the memory 1005 and capable of running on the processor 1004, and the processor 1004 invokes the instructions or program in the memory 1005 to perform the method performed by the modules shown in FIG. 6, with the same technical effects achieved. To avoid repetition, details are not described herein again.

An embodiment of this application further provides a readable storage medium. The readable storage medium stores a program or instructions. When the program or instructions are executed by a processor, the processes of the method embodiments of the interference measurement method are implemented, with the same technical effects achieved. To avoid repetition, details are not described herein again.

The processor is a processor in the terminal in the foregoing embodiments. The readable storage medium includes a computer-readable storage medium, for example, a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions for a network side device, to implement the processes of the method embodiments of the interference measurement method, with the same technical effects achieved. To avoid repetition, details are not described herein again.

An embodiment of this application further provides a computer program product. The computer program product includes a processor, a memory, and a program or instructions stored in the memory and capable of running on the processor. When the program or instructions are executed by the processor, the processes of the method embodiments of the interference measurement method are implemented, with the same technical effects achieved. To avoid repetition, details are not described herein again.

It should be understood that the chip provided in this embodiment of this application may also be referred to as a system-level chip, a system on chip, a chip system, a system-on-a-chip, or the like.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or a compact disc), and includes several instructions for instructing a terminal (which may be a mobile phone, a computer, a server, a network device, or the like) to perform the method described in each embodiment of this application. The foregoing describes the embodiments of this application with reference to the accompanying drawings. However, this application is not limited to the foregoing specific embodiments.

The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An interference measurement method, comprising:
acquiring, by a first base station in a first cell, state information, wherein the state information comprises at least one of the following: an operating parameter of a target wireless auxiliary device, configuration information of a reference signal of a second cell, or a first measurement result, the second cell is a neighboring cell of the first cell, and the first measurement result is a measurement result obtained by measuring a reference signal of the first cell jointly by a second terminal in the second cell and the target wireless auxiliary device;
configuring, by the first base station, a measurement object for a first terminal based on the state information, wherein the measurement object is used for assessing interference jointly caused by the second cell and the target wireless auxiliary device to the first terminal, and the first terminal is a terminal accessing the first cell; and
receiving, by the first base station, a second measurement result reported by the first terminal, wherein the second measurement result is a result obtained by the first terminal by measuring the measurement object.

2. The method according to claim 1, wherein the target wireless auxiliary device comprises at least one of the following:
a first wireless auxiliary device, wherein the first wireless auxiliary device is controlled by a second base station in the second cell;
a second wireless auxiliary device, wherein the second wireless auxiliary device is controlled jointly by the first base station and the second base station, and the second wireless auxiliary device provides services for the first cell and the second cell in a time division multiplexing manner; or
a third wireless auxiliary device, wherein the third wireless auxiliary device is controlled jointly by the first base station and the second base station, and the third wireless auxiliary device provides services for the first cell and the second cell in a spatial multiplexing manner.

3. The method according to claim 2, wherein the measurement object comprises at least one of the following:
a plurality of first reference signals transmitted by the first cell, wherein different first reference signals correspond to different forwarding beams of the first wireless auxiliary device;

a second reference signal of the second cell in a plurality of measurement durations, wherein the first wireless auxiliary device forwards the second reference signal in different measurement durations by using different forwarding beams;

a third reference signal of the second cell, wherein the third reference signal is a reference signal of the second terminal in the second cell, and the first wireless auxiliary device forwards the third reference signal by using one or more forwarding beams;

a plurality of fourth reference signals transmitted by the first cell, wherein different fourth reference signals correspond to different forwarding beams of the second wireless auxiliary device;

a fifth reference signal of the second cell in a plurality of measurement durations, wherein the second wireless auxiliary device broadcasts the fifth reference signal in different measurement durations by using different forwarding beams;

a sixth reference signal of the second cell, wherein the sixth reference signal is a reference signal of the second terminal in the second cell, and the second wireless auxiliary device forwards the sixth reference signal by using one or more forwarding beams; or a seventh reference signal of the second cell, wherein the seventh reference signal is a reference signal of the second cell, and the seventh reference signal is used for measuring a forwarding beam of the third wireless auxiliary device and/or training a forwarding beam of the third wireless auxiliary device.

4. The method according to claim 3, wherein before the configuring, by the first base station, the measurement object for the first terminal, the method further comprises:

determining, by the first base station based on the state information, whether a coverage area of the first cell is affected by the first wireless auxiliary device.

5. The method according to claim 4, wherein the acquiring, by a first base station in a first cell, state information comprises at least one of the following:

acquiring, by the first base station, the state information from the second base station; receiving, by the first base station, a reporting message transmitted by the first terminal, wherein the reporting message carries the operating parameter; or receiving, by the first base station, a signal transmitted by the first wireless auxiliary device, and acquiring the operating parameter based on the signal transmitted by the first wireless auxiliary device.

6. The method according to claim 2, wherein an operating parameter of the first wireless auxiliary device comprises at least one of the following: an identifier of the first wireless auxiliary device, an identifier of the second cell corresponding to the first wireless auxiliary device, location information of the first wireless auxiliary device, a first correspondence between a pattern set of the first wireless auxiliary device and a forwarding beam of the first wireless auxiliary device, or a time configuration corresponding to each pattern in the pattern set of the first wireless auxiliary device; and the first measurement result comprises at least one of the following: an identifier of the first cell, or an identifier of the reference signal of the first cell.

7. The method according to claim 4, wherein the acquiring, by a first base station in a first cell, state information comprises:

receiving, by the first base station, the first measurement result provided by the second base station, wherein the first measurement result comprises at least one of the following: identification information of an eighth reference signal affected by the first wireless auxiliary device, a first correspondence between the eighth reference signal and a forwarding beam and/or a pattern set of the first wireless auxiliary device, or signal quality of the eighth reference signal, and the eighth reference signal comprises at least one of the following: a synchronization signal block (SSB) of the first cell, a tracking channel state information-reference signal (CSI-RS) of the first cell, or a UE-specific reference signal (RS) of the first cell.

8. The method according to claim 7, wherein the forwarding beam in the first correspondence comprises a forwarding beam used by the first wireless auxiliary device for broadcasting, or a forwarding beam used by the first wireless auxiliary device for serving the specified second terminal.

9. The method according to claim 2, wherein after the receiving, by the first base station, a second measurement result reported by the first terminal, the method further comprises: performing, by the first base station, interference coordination with the second base station based on the second measurement result, and scheduling the first terminal based on a coordination result.

10. The method according to claim 9, wherein the performing, by the first base station, interference coordination with the second base station based on the second measurement result, and scheduling the first terminal based on a coordination result comprises:

determining, by the first base station based on the second measurement result, whether signal quality of the first terminal is affected by the first wireless auxiliary device, and notifying the second base station of a determining result, so that the second base station can update an operating state of the first wireless auxiliary device based on the determining result;

receiving, by the first base station, an updated operating state of the first wireless auxiliary device, wherein the operating state of the first wireless auxiliary device comprises time configuration information of each forwarding beam and/or pattern set of the first wireless auxiliary device; and scheduling, by the first base station, the first terminal based on the updated operating state of the first wireless auxiliary device.

11. The method according to claim 10, wherein the determining, by the first base station based on the second measurement result, whether signal quality of the first terminal is affected by the first wireless auxiliary device, and notifying the second base station of a determining result comprises:

dividing, by the first base station based on the second measurement result, forwarding beams and/or pattern sets of the first wireless auxiliary device into a plurality of groups, wherein the plurality of groups comprise a first group and a second group, the first group is a forwarding beam and/or a pattern set having a positive influence on the first cell, and the second group is a forwarding beam and/or a pattern set having a negative influence on the first cell; and notifying, by the first base station, the second base station of the first group and/or the second group.

12. The method according to claim 9, wherein the performing, by the first base station, interference coordination with the second base station based on the second measurement result, and scheduling the first terminal based on a coordination result comprises:

if the first cell and the second cell use the same frequency band, performing, by the first base station, interference coordination with the second base station based on the second measurement result, and controlling the third wireless auxiliary device to generate a multi-forwarding beam pattern set, to reflect signals of the first base station and the second base station to different directions; and/or if the first cell and the second cell use different frequency bands, determining, by the first base station and the second base station, terminals that need to be scheduled by the first base station and the second base station respectively in each pattern set of the third wireless auxiliary device, and jointly determining an operating state of the third wireless auxiliary device.

13. A network side device, the network side device being a first base station in a first cell and comprising a processor, a memory, and a program or instructions stored in the memory and capable of running on the processor, wherein when the program or instructions are executed by the processor, following steps are implemented:

acquiring state information, wherein the state information comprises at least one of the following: an operating parameter of a target wireless auxiliary device, configuration information of a reference signal of a second cell, or a first measurement result, the second cell is a neighboring cell of the first cell, and the first measurement result is a measurement result obtained by measuring a reference signal of the first cell jointly by a second terminal in the second cell and the target wireless auxiliary device;

configuring a measurement object for a first terminal based on the state information, wherein the measurement object is used for assessing interference jointly caused by the second cell and the target wireless auxiliary device to the first terminal, and the first terminal is a terminal accessing the first cell; and receiving a second measurement result reported by the first terminal, wherein the second measurement result is a result obtained by the first terminal by measuring the measurement object.

14. The network side device according to claim 13, wherein the target wireless auxiliary device comprises at least one of the following:

a first wireless auxiliary device, wherein the first wireless auxiliary device is controlled by a second base station in the second cell;

a second wireless auxiliary device, wherein the second wireless auxiliary device is controlled jointly by the first base station and the second base station, and the second wireless auxiliary device provides services for the first cell and the second cell in a time division multiplexing manner; or a third wireless auxiliary device, wherein the third wireless auxiliary device is controlled jointly by the first base station and the second base station, and the third wireless auxiliary device provides services for the first cell and the second cell in a spatial multiplexing manner.

15. The network side device according to claim 14, wherein the measurement object comprises at least one of the following:

a plurality of first reference signals transmitted by the first cell, wherein different first reference signals correspond to different forwarding beams of the first wireless auxiliary device;

a second reference signal of the second cell in a plurality of measurement durations, wherein the first wireless auxiliary device forwards the second reference signal in different measurement durations by using different forwarding beams;

a third reference signal of the second cell, wherein the third reference signal is a reference signal of the second terminal in the second cell, and the first wireless auxiliary device forwards the third reference signal by using one or more forwarding beams;

a plurality of fourth reference signals transmitted by the first cell, wherein different fourth reference signals correspond to different forwarding beams of the second wireless auxiliary device;

a fifth reference signal of the second cell in a plurality of measurement durations, wherein the second wireless auxiliary device broadcasts the fifth reference signal in different measurement durations by using different forwarding beams;

a sixth reference signal of the second cell, wherein the sixth reference signal is a reference signal of the second terminal in the second cell, and the second wireless auxiliary device forwards the sixth reference signal by using one or more forwarding beams; or a seventh reference signal of the second cell, wherein the seventh reference signal is a reference signal of the second cell, and the seventh reference signal is used for measuring a forwarding beam of the third wireless auxiliary device and/or training a forwarding beam of the third wireless auxiliary device.

16. The network side device according to claim 15, wherein when the program or instructions are executed by the processor, following step is further implemented:

before the configuring the measurement object for the first terminal, determining, based on the state information, whether a coverage area of the first cell is affected by the first wireless auxiliary device.

17. The network side device according to claim 16, wherein the acquiring state information comprises at least one of the following:

acquiring the state information from the second base station;

receiving a reporting message transmitted by the first terminal, wherein the reporting message carries the operating parameter; or receiving a signal transmitted by the first wireless auxiliary device, and acquiring the operating parameter based on the signal transmitted by the first wireless auxiliary device.

18. A terminal, the terminal being a first terminal and comprising a processor, a memory, and a program or instructions stored in the memory and capable of running on the processor, wherein when the program or instructions are executed by the processor, following steps are implemented:

receiving a measurement object configured by a first base station in a first cell, wherein the measurement object is used for assessing interference jointly caused by a second cell and a target wireless auxiliary device to the first terminal, the second cell is a neighboring cell of the first cell, and the first terminal is a terminal accessing the first cell; and performing interference measurement based on the measurement object, and reporting a measurement result to the first base station, wherein the measurement result is a result obtained by the first terminal by measuring the measurement object.

19. The terminal according to claim 18, wherein the target wireless auxiliary device comprises at least one of the following:

a first wireless auxiliary device, wherein the first wireless auxiliary device is controlled by a second base station in the second cell;

a second wireless auxiliary device, wherein the second wireless auxiliary device is controlled jointly by the first base station and the second base station, and the second wireless auxiliary device provides services for the first cell and the second cell in a time division multiplexing manner; or a third wireless auxiliary device, wherein the third wireless auxiliary device is controlled jointly by the first base station and the second base station, and the third wireless auxiliary device provides services for the first cell and the second cell in a spatial multiplexing manner.

20. The terminal according to claim 19, wherein the measurement object comprises at least one of the following:

a plurality of first reference signals transmitted by the first cell, wherein different first reference signals correspond to different forwarding beams of the first wireless auxiliary device;

a second reference signal of the second cell in a plurality of measurement durations, wherein the first wireless auxiliary device forwards the second reference signal in different measurement durations by using different forwarding beams;

a third reference signal of the second cell, wherein the third reference signal is a reference signal of the second terminal in the second cell, and the first wireless auxiliary device forwards the third reference signal by using one or more forwarding beams;

a plurality of fourth reference signals transmitted by the first cell, wherein different fourth reference signals correspond to different forwarding beams of the second wireless auxiliary device;

a fifth reference signal of the second cell in a plurality of measurement durations, wherein the second wireless auxiliary device broadcasts the fifth reference signal in different measurement durations by using different forwarding beams;

a sixth reference signal of the second cell, wherein the sixth reference signal is a reference signal of the second terminal in the second cell, and the second wireless auxiliary device forwards the sixth reference signal by using one or more forwarding beams; or a seventh reference signal of the second cell, wherein the seventh reference signal is a reference signal of the second cell, and the seventh reference signal is used for measuring a forwarding beam of the third wireless auxiliary device and/or training a forwarding beam of the third wireless auxiliary device.

* * * * *